United States Patent
Przybyl et al.

(10) Patent No.: US 10,723,431 B1
(45) Date of Patent: Jul. 28, 2020

(54) SYSTEMS AND METHODS FOR CONTROLLING VESSEL SPEED WHEN TRANSITIONING FROM LAUNCH TO CRUISE

(71) Applicant: Brunswick Corporation, Mettawa, IL (US)

(72) Inventors: Andrew J. Przybyl, Berlin, WI (US); Steven J. Andrasko, Oshkosh, WI (US); Justin R. Poirier, Fond du Lac, WI (US); Kenneth G. Gable, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 181 days.

(21) Appl. No.: 15/714,244

(22) Filed: Sep. 25, 2017

(51) Int. Cl.
| | |
|---|---|
| *B63H 21/21* | (2006.01) |
| *G01S 19/52* | (2010.01) |
| *B63J 99/00* | (2009.01) |
| *B63B 79/00* | (2020.01) |

(52) U.S. Cl.
CPC ............ *B63H 21/21* (2013.01); *B63J 99/00* (2013.01); *G01S 19/52* (2013.01); *B63B 79/00* (2020.01)

(58) Field of Classification Search
CPC combination set(s) only.
See application file for complete search history.

(56) References Cited

U.S. PATENT DOCUMENTS

| | | | |
|---|---|---|---|
| 7,214,110 B1 | 5/2007 | Ehlers et al. | |
| 7,361,067 B1 | 4/2008 | Smedema | |
| 9,145,839 B1 | 9/2015 | Andrasko | |
| 9,377,780 B1 | 6/2016 | Arbuckle et al. | |
| 2004/0032324 A1* | 2/2004 | Otani | B60Q 1/44 340/467 |
| 2005/0114008 A1* | 5/2005 | Scelers | B60T 8/885 701/92 |
| 2005/0278094 A1* | 12/2005 | Swinbanks | B63B 17/0081 701/37 |
| 2011/0257847 A1* | 10/2011 | Uematsu | B60T 8/172 701/48 |

(Continued)

OTHER PUBLICATIONS controlguru.com, "PID Control and Derivative on Measurement," webpage article, posted Apr. 7, 2015, http://controlguru.com/pidcontrolandderivativeonmeasurement/, website last visited Aug. 12, 2016.

(Continued)

*Primary Examiner* — Rami Khatib
(74) *Attorney, Agent, or Firm* — Andrus Intellectual Property Law, LLP (57) ABSTRACT

A method for controlling marine vessel speed includes determining a setpoint vessel speed, which is constant while the system is operating in a cruise control mode. The method includes using vessel speed feedback control to adjust operational characteristics of the engine so as to achieve the setpoint vessel speed. The method also includes determining a measured vessel speed and filtering the measured vessel speed. In response to determining that the measured vessel speed is within a given range of the constant setpoint vessel speed, the method includes transitioning to the cruise control mode and comparing the filtered measured vessel speed to the constant setpoint vessel speed for purposes of the feedback control.

14 Claims, 5 Drawing Sheets

(56) References Cited

U.S. PATENT DOCUMENTS

| | | | |
|---|---|---|---|
| 2011/0285518 A1* | 11/2011 | Gordon | B60W 40/06 |
| | | | 340/425.5 |
| 2016/0266580 A1* | 9/2016 | Okamoto | B63H 25/46 |
| 2016/0297508 A1* | 10/2016 | Renaud | G01V 1/3808 |
| 2017/0137103 A1* | 5/2017 | Ito | B63H 20/00 |
| 2017/0276783 A1* | 9/2017 | McCabe | G01S 7/2955 |
| 2017/0277189 A1* | 9/2017 | Johnson | G05D 1/0206 |
| 2017/0313397 A1* | 11/2017 | Ni | B63H 21/21 |
| 2017/0370319 A1* | 12/2017 | Homant | F02D 41/3064 |
| 2019/0210705 A1* | 7/2019 | Lindeborg | B63H 21/21 |

OTHER PUBLICATIONS

Andrasko et al., "Systems and Methods for Controlling Vessel Speed when Transitioning from Launch to Cruise", Unpublished U.S. Appl. No. 15/252,911, filed Aug. 31, 2016.

Anschuetz et al., "Methods for Automatically Controlling Attitude of a Marine Vessel During Launch", Unpublished U.S. Appl. No. 15/693,713, filed Sep. 1, 2017.

Visoli, A., "Practical PID Control", chapter 2, book, 2006, pp. 19-34, Published by Springer.

Ruel, Michel, "Using Filtering to Improve Performance", online paper, 2003, presented at ISA Expo 2003.

* cited by examiner

| LEVEL | RATE (ΔKPH/SEC) | % OVERSHOOT | DURATION (SECONDS) |
|---|---|---|---|
| 1 | 1.0 | 0 | 0 |
| 2 | 2.0 | 5 | 2.5 |
| 3 | 3.0 | 10 | 3.0 |
| 4 | 3.5 | 15 | 3.5 |
| 5 | 4.0 | 20 | 4.0 |

SYSTEMS AND METHODS FOR CONTROLLING VESSEL SPEED WHEN TRANSITIONING FROM LAUNCH TO CRUISE

FIELD

The present disclosure relates to system and methods for controlling speed of a marine vessel propelled by a marine propulsion system.

BACKGROUND

U.S. Pat. Nos. 7,214,110 and 7,361,067 disclose acceleration control systems that allow the operator of a marine vessel to select an acceleration profile to control the engine speed of a marine vessel from an initial starting speed to a final desired speed. When used in conjunction with tow sports, such as wake boarding and water skiing, the use of acceleration profile provides consistent performance during the period of time when a water skier is accelerated from a stationary position to a full speed condition.

U.S. Pat. No. 10,343,758 discloses a method for controlling a speed of a marine vessel, including accelerating the marine vessel in response to a launch command. The method then includes holding the vessel speed at a desired vessel speed with a controller using feedback control. The controller phases in a derivative term of the feedback control in response to determining that the following conditions are true: (a) the vessel speed is within a given range of the desired vessel speed; and (b) an acceleration rate of the marine vessel is less than a given value.

U.S. Pat. No. 10,351,221 discloses a method for controlling a trim position of a marine propulsion device, including receiving operator demands corresponding to propulsion system operating speeds and determining a rate of change of demand versus time between an initial and a subsequent operator demand. When the rate of change of demand exceeds a predetermined rate, the control module uses successively measured operating speeds of the propulsion system and an offset trim profile to determine setpoint trim positions for the propulsion device. As the propulsion system's measured operating speed increases from an initial to a subsequent operating speed, the control module controls a trim actuator to rotate the propulsion device to the setpoint trim positions. An operating speed at which the propulsion device begins trimming up is less according to the offset trim profile than according to a base trim profile, which is utilized when the rate of change does not exceed the predetermined rate.

The above patents and patent applications are hereby incorporated herein by reference.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example of the present disclosure, a method for controlling a speed of a marine vessel powered by a marine propulsion system including an engine is disclosed. The method is carried out by a control module and includes determining a setpoint vessel speed for the marine vessel, wherein the setpoint vessel speed is constant while the system is operating in a cruise control mode. The method includes using vessel speed feedback control to adjust operational characteristics of the engine so as to achieve the setpoint vessel speed. The method also includes determining a measured vessel speed and filtering the measured vessel speed. In response to determining that the measured vessel speed is within a given range of the constant setpoint vessel speed, the method includes transitioning to the cruise control mode and comparing the filtered measured vessel speed to the constant setpoint vessel speed for purposes of the feedback control.

In another example of the present disclosure, a system for controlling a speed of a marine vessel includes a first feedback controller controlling the vessel speed while the vessel is accelerating according to a launch mode and a second feedback controller controlling the vessel speed while the vessel is maintaining a desired speed according to a cruise control mode. A propulsion device accepts inputs from the first and second feedback controllers and operates according to the inputs so as to propel the vessel in the launch mode or the cruise control mode, respectively. A global positioning system device measures the vessel speed, and a control module filters the measured vessel speed. The second feedback controller minimizes a difference between the filtered measured vessel speed and the desired vessel speed in response to the control module determining that the system has transitioned from the launch mode to the cruise control mode.

According to another method for controlling a speed of a marine vessel, the marine vessel accelerates in response to a launch command. The method includes controlling acceleration of the marine vessel with a control module using vessel speed feedback control. The method also includes maintaining the vessel speed at a desired vessel speed using the feedback control. The method includes measuring the vessel speed and filtering the measured vessel speed for use during the feedback control. The control module uses a first filter to filter the measured vessel speed while the marine vessel accelerates and uses a second filter to filter the measured vessel speed while the marine vessel maintains the desired vessel speed.

BRIEF DESCRIPTION OF THE DRAWINGS

Examples of systems and methods for controlling a marine vessel are described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

Figure 1:
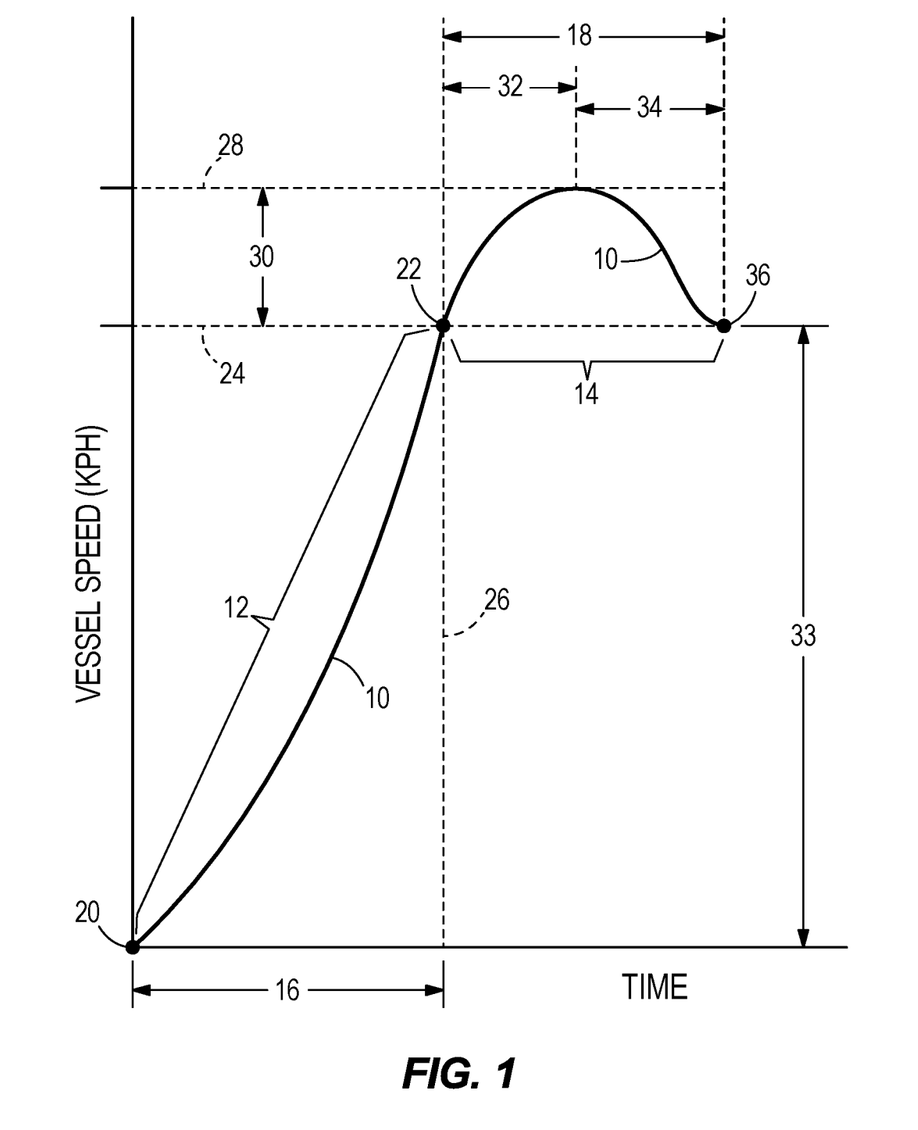
FIG. 1 shows an exemplary acceleration profile according to the present disclosure.

FIG. 1 is a graphical representation of an exemplary acceleration profile 10 for a marine vessel. The acceleration profile 10, illustrated as vessel speed as a function of time, comprises a first segment 12 and a second segment 14. The first segment 12 is associated with a first period of time 16 and the second segment 14 is associated with a second period of time 18. The first segment 12 of the acceleration profile 10 extends from an initial vessel speed 20 to a vessel speed 22 which is substantially equal to a desired vessel speed, or constant setpoint vessel speed, which is represented by dashed line 24. The first segment 12 of the acceleration profile 10 corresponds to a launch mode of the marine vessel and its propulsion controller. The second segment 14 of the acceleration profile 10 extends from that desired vessel speed, at point 22, which occurs at the end of the first period of time 16 represented by dashed line 26, to a speed that is somewhat greater than the desired vessel speed 24. This greater vessel speed is identified by dashed line 28 in FIG. 1. The greater speed 28 is of a greater magnitude than the desired vessel speed 24 by a preselected magnitude illustrated by dimension 30. It can be seen that the second segment 14 can comprise an acceleration portion during the time period identified by arrow 32, and a deceleration portion during the time period represented by arrow 34. Both the acceleration portion and the deceleration portion occur during the second period of time 18. After the second period of time 18, which ends at point 36, the vessel speed can be held at the desired vessel speed 24 for as long as the operator wishes to cruise at that speed. Thus, the time period from dashed line 26 on corresponds to a cruise control mode of the marine vessel and its propulsion controller.

Figure 2:
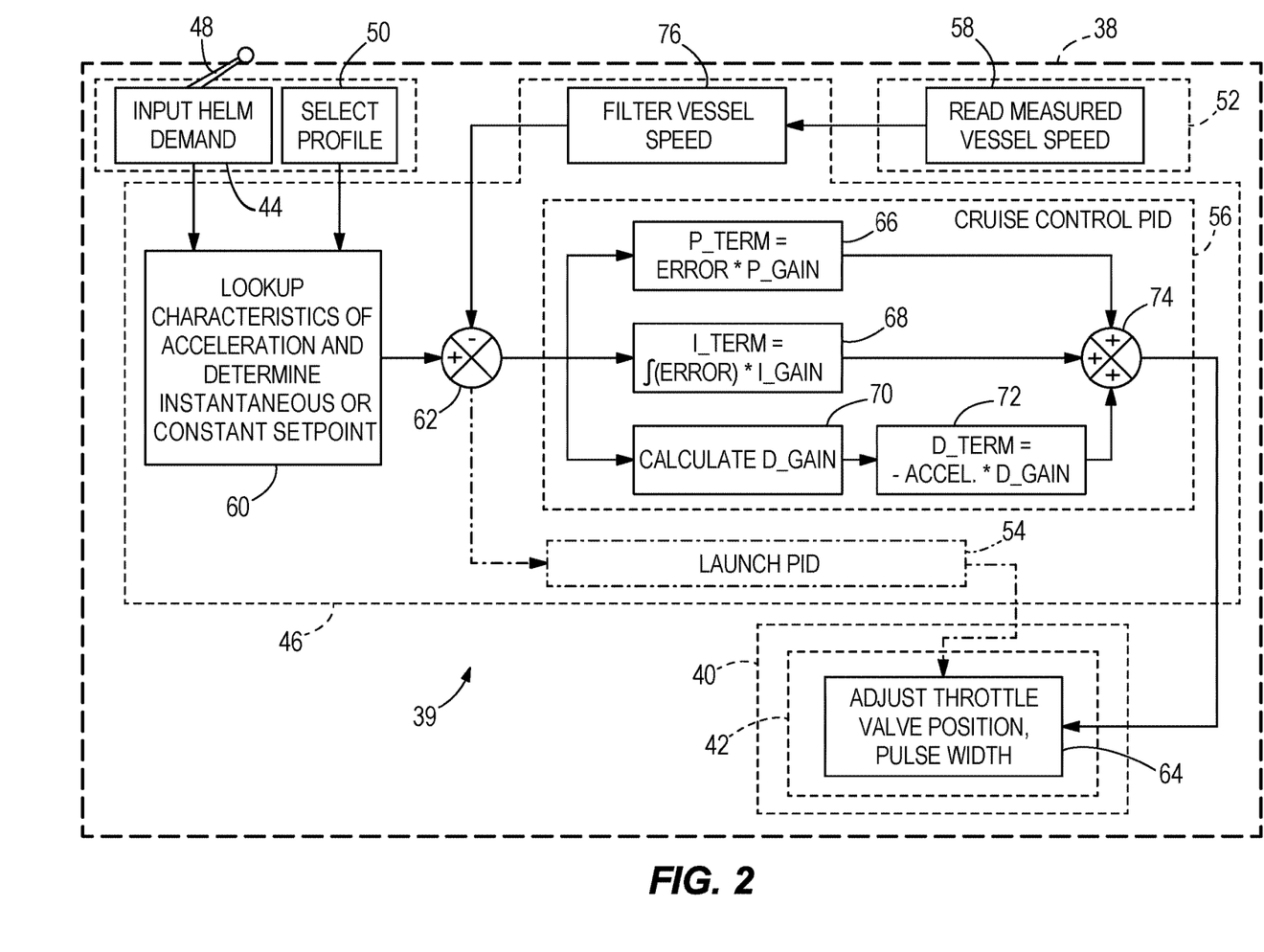
FIG. 2 illustrates a schematic of a system for carrying out the methods of the present disclosure.

FIG. 2 is a schematic representation of a marine propulsion system 39 with which one example of the present disclosure can typically be used. Dashed line box 38 represents a marine vessel in which a marine propulsion device 40, including an engine 42, provides marine propulsion for the vessel 38. A manually controllable throttle mechanism 44 allows the operator of the vessel 38 to control the vessel speed by way of controlling the operating speed of the engine 42. A propulsion control module 46, such as an engine control module, controls the operating speed of the engine 42 in conformance with signals received from the position of a throttle handle 48 of the manually controllable throttle mechanism 44. Also shown in FIG. 2 is a control panel 50 which allows the operator of the vessel 38 to provide additional information to the control module 46. The control panel 50 can include a keyboard, a keypad, a touch screen, or any combination of the above input devices and other known user input devices. A global positioning system (GPS) device 52, which provides geographical location signals to the control module 46, is also provided on the vessel 38. The GPS device 52 may also provide a reading of speed over ground (SOG) to the control module 46, calculated as distance covered in a given period of time, which constitutes one measurement of vessel speed. However, it should be understood that the GPS device 52 is not required in all embodiments of the present disclosure and that a speedometer, pitot tube, paddlewheel, etc. are alternatives for measuring vessel velocity.

With reference to FIGS. 1 and 2, the control panel 50 allows the operator of the marine vessel to select an acceleration profile, typically from a portfolio of potential profiles, and provides that selection to the control module 46 for future application when a start command signal is received. A start command may be received by the control module 46 from the manually controllable throttle mechanism 44. The start command can be initiated by the sudden movement of the throttle handle 48 from a neutral position or idle speed position to a higher speed command, such as maximum speed or near maximum speed.

With continued reference to FIGS. 1 and 2, several characteristics of one example of the present disclosure can be observed. For example, the first segment 12 of the acceleration profile 10, during the first period of time 16, is generally constant. The graphical representation in FIG. 1 shows this first segment 12 as representing a slightly increasing acceleration rate as the vessel speed changes from point 20 to point 22. However, this acceleration rate can be much more constant than is shown in FIG. 1. In other words, the first segment 12 of the acceleration profile can be virtually a straight line extending between points 20 and 22. After the expiration of the first period of time 16, an overshoot condition is intentionally provided, but is not necessary. After achieving the desired vessel speed 24, at point 22, the vessel speed is increased beyond that desired vessel speed 24 to achieve the overshoot represented by dimension 30. This results in the achievement of the speed represented by dashed line 28. This continued acceleration occurs in the time period identified by arrow 32. Then, according to a preselected procedure, the vessel speed is decelerated during time period 34 to the desired vessel speed 24, which is achieved at point 36 in FIG. 1.

Figure 3:
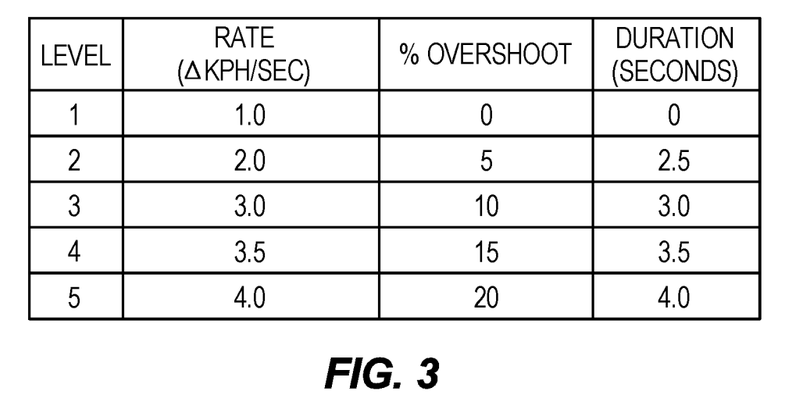
FIG. 3 is an exemplary table showing parameters for overshooting a desired vessel speed according to exemplary acceleration profiles.

The information relating to the acceleration profile, in one example, is represented by three parameters for each of five potential acceleration profiles. Exemplary information, which is not limiting on the scope of the present disclosure, is shown in FIG. 3. In this exemplary table of FIG. 3, five skill levels are represented. For each level, the rate of acceleration, represented as A KPH/second, is stored along with an associated percentage overshoot magnitude. The percentage overshoot magnitude is equivalent to the percentage of the magnitude represented by dimension 30 in FIG. 1 to the magnitude represented by arrow 33 in FIG. 1. If the final desired vessel speed is 20 KPH, for example, the level three profile in FIG. 3 would prescribe a 10% overshoot, or 2 KPH, which would be the difference represented by dimension 30 in FIG. 1. In FIG. 3, the overshoot duration for each level is also stored. The overshoot duration represents the magnitude of the second period of time 18, measured in seconds, for each of the acceleration profiles. Here, for a level three profile, the overshoot would last for 3.0 seconds. Using the control panel 50, the operator of the marine vessel would select a profile (e.g., 1-5) prior to providing the start signal, which, as noted above, occurs when the operator rapidly moves the manually operated throttle handle 48 from an initial speed position to a higher speed position. Note that the table shown in FIG. 3 is not the only way to program acceleration profiles into the memory of the control module 46, and equations or other types of input-output maps could be used.

Figure 4:
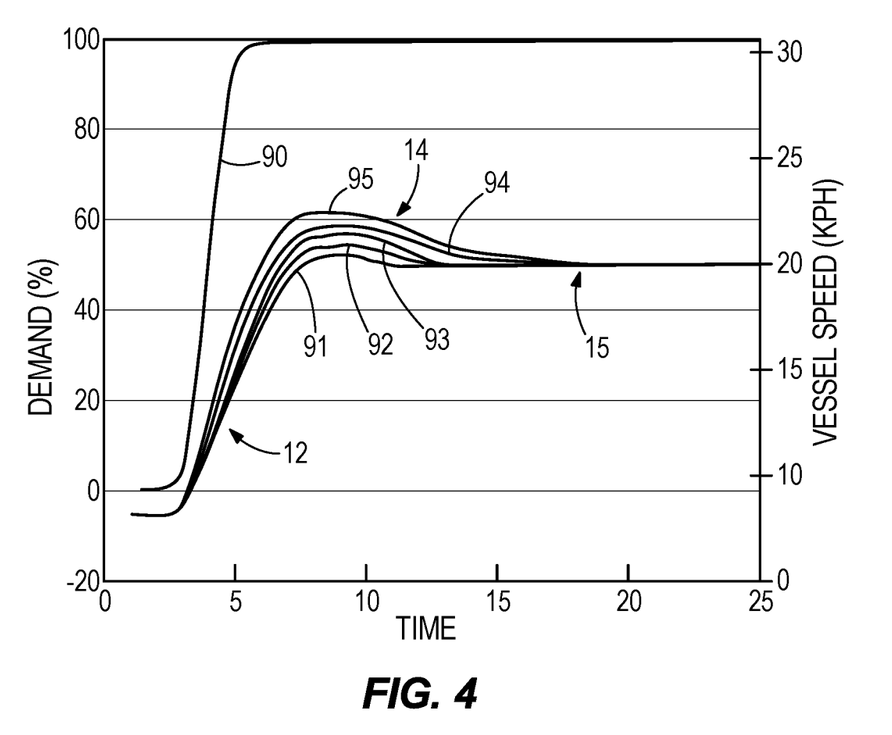
FIG. 4 illustrates several exemplary acceleration profiles.

FIG. 4 is a graphical representation of several acceleration profiles. Line 90 represents the position of the throttle handle 48, measured with respect to the left axis, as a percentage of a maximum vessel speed command. In addition, five acceleration profiles 91, 92, 93, 94, 95 are shown with respect to the right axis in FIG. 4. As shown, this particular embodiment of the present disclosure responds to a rapid movement of the throttle handle 48, as represented by line 90, from a zero speed command to a 100% speed command in a relatively short period of time. When this rapid movement of the throttle handle 48 is detected by the control module 46, one of the illustrated acceleration profiles is followed. It should be understood that although five profiles are shown simultaneously in FIG. 4, only one profile would be applied, according to the operator's prior selection via the control panel 50. In FIG. 4, acceleration profile 91 conforms generally to the level one profile in FIG. 3, acceleration profile 92 in FIG. 4 conforms generally to the level two profile shown in FIG. 3, and so on.

As can be seen, each acceleration profile 91-95 comprises the initial acceleration portion, or first segment 12, corresponding to vessel launch; an optional overshoot portion, or second segment 14, corresponding to the beginning of vessel cruise control; and a steady state portion, or third segment 15, corresponding to continuation of vessel cruise control. The overshoot portion is perceived by the operator as a more robust or aggressive start from a stationary position to an "on plane" position or to a "mushing" position (between on-plane and off-plane). This is a result of the vessel speed lagging behind the engine speed due to the load imposed by the marine vessel 38. As shown in FIG. 4, all five acceleration profiles 91-95 begin at the same initial vessel speed and end by cruising at the same desired final vessel speed, but vary significantly with respect to the acceleration rate of the first segment 12 and the overshoot of the second segment 14.

The processes by which the control module 46 shown in FIG. 2 controls the vessel speed can vary from application to application. In a typical application, during the first segment 12 of the acceleration profile and subsequent to a start command, the control module 46 would repeatedly schedule the velocity ramp by increasing the opening of the throttle plate of the engine 42. Adjustments to the rate of throttle plate movement would be made as a function of the launch intensity level (A KPH/second). This function would continuously be performed during the first segment 12 of the acceleration profile. Then, after determining the desired percentage of optional overshoot for the second segment 14 of the acceleration profile, for example using the table of FIG. 3, the control module 46 would perform a generally similar function in order to achieve the desired shape of the acceleration profile, as discussed above in conjunction with FIG. 1. Alternatively, the control module 46 could vary the fuel injected into the cylinders of the engine 42, such as in a direct injection engine, to achieve the instantaneous set-point vessel speed at each instant during the time period of the acceleration profile. It should be understood that those skilled in the art of engine control have many alternative processes that are well known for controlling the vessel speed at any particular instant in time by adjusting any number of operational characteristics of the engine 42, including but not limited to those listed herein above. These processes can be performed at each instant in time over the time period of the acceleration profile to achieve the desired acceleration profile.

Referring again to FIG. 2, as mentioned herein above, the system of the present disclosure includes a control module 46. The control module 46 may include a computing system that includes a processing system, storage system, software, and input/output (I/O) interfaces. The processing system loads and executes software from the storage system, including a vessel launch software application module. When executed by the computing system, the vessel launch software application module directs the processing system to operate as described herein to execute a vessel launch method.

The computing system may include one or many application modules and one or more processors, which may be communicatively connected. The processing system can comprise a microprocessor and other circuitry that retrieves and executes software from the storage system. The processing system can be implemented within a single processing device but can also be distributed across multiple processing devices or sub-systems that cooperate in existing program instructions. Non-limiting examples of the processing system include general purpose central processing units, applications specific processors, and logic devices.

The storage system can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

Still referring to FIG. 2, the vessel launch software application module(s) may include a first feedback controller 54 controlling vessel speed while the marine vessel 38 is accelerating according to the launch mode and a second feedback controller 56 controlling vessel speed while the vessel 38 is maintaining a desired speed according to the cruise control mode. The first and second feedback controllers 54, 56 can be separate from the control module 46, or can be control sections within the control module 46. In another example, the feedback controllers 54, 56 are not different components or separate control sections at all, but are stored as software code in the memory of the control module 46 that is programmed to execute one feedback control algorithm or another depending on existing conditions. Each of the first and second feedback controllers 54, 56 can use a different feedback control algorithm to control vessel speed. For instance, if the feedback control algorithm is a proportional-integral-derivative (PID) control algorithm, the PID gains and/or limits for each feedback controller 54, 56 could be different. A propulsion device 40 accepts inputs from the first and second feedback controllers 54, 56 and operates according to the inputs so as to propel the marine vessel 38 in the launch mode or the cruise control mode, respectively. The use of different control parameters from two different feedback controllers 54, 56 is helpful because when the marine vessel 38 is accelerating, the propeller is not hooked up (i.e., is slipping), and the load and change in load on the marine vessel 38 are therefore very different than when the marine vessel 38 is holding its speed in cruise control mode. Using first and second PID feedback controllers 54, 56 with different control parameters allows for separate calibration of each controller, which in turn allows for customized control over the transient conditions encountered during launch and customized control over the relatively steady-state conditions encountered while in cruise control mode. In another example, only one feedback controller is used for controlling the vessel in both the launch and cruise control modes, and a derivative term is not phased in until certain conditions are true, which conditions will be described in more detail herein below.

FIG. 2 also shows an optional software algorithm for phasing in the derivative term to prevent step changes and over/undershoot of the desired vessel speed. The algorithm causes the second feedback controller 56 to phase in the derivative term of its PID control in response to a determination that (a) the propulsion system 39 has transitioned from the launch mode to the cruise control mode, and that (b) an acceleration rate of the marine vessel 38 is less than a given value. The control module 46 can phase in the derivative term in different ways. In one example, the second feedback controller 56 ramps in the derivative term at a predetermined rate. In other words, the second feedback controller 56 may ramp in the derivative term in calculated increments. This could be done by ramping in the derivative gain at a predetermined rate before multiplying the full derivative gain by the derivative of the error. In some examples, the derivative gain can be ramped in non-linearly. In some examples, the derivative term can be rate-limited, as opposed to the derivative gain being rate-limited. Note that in any case, damping of the derivative term helps damp the delay in response between a change in engine speed and a resulting change in vessel speed.

The present system will accept an input regarding a selected acceleration profile for launch of the marine vessel 38 via the control panel 50. The control module 46 will then receive a start command in response to sudden movement of the throttle handle 48 of manually controllable throttle mechanism 44. The control module 46 will then look up characteristics of the appropriate acceleration profile as shown at box 60, including the desired constant setpoint vessel speed, the acceleration rate, the optional overshoot, and the overshoot duration. In one example, the desired constant setpoint vessel speed may be a maximum vessel speed corresponding to 100% movement of the throttle handle 48. In another example, the desired constant setpoint vessel speed may correspond to an ending position of the throttle handle 48 that is less than 100% movement. As noted hereinabove, the acceleration rate, the overshoot, and the overshoot duration can be determined using a table such as that shown in FIG. 3. Thus, box 60 determines both a desired constant setpoint vessel speed at which speed is to be maintained during cruise control and a series of increasing, instantaneous setpoint vessel speeds that are to be achieved during launch. Once the instantaneous or constant setpoint vessel speed for the particular iteration of control is known, this value is passed to a summer 62. Meanwhile, a GPS device 52 may read the actual, measured vessel speed, as shown at box 58, which is also passed to the summer 62.

The difference between the setpoint and measured vessel speeds determined by summer 62 is passed to the launch PID controller (first feedback controller 54) while the marine vessel 38 is operating in the launch mode. The output of the first feedback controller 54 is used to adjust a throttle position and/or pulse width of fuel injection at the engine 42, as shown at box 64. The measured vessel speed as read by the GPS device 52 will then change in response to the change in engine speed, the instantaneous setpoint vessel speed will increase according to the acceleration rate determined from the table in FIG. 3, and the first feedback controller 54 will recalculate adjustments to the engine's operating characteristic(s). This is accomplished via known PID control techniques until the vessel speed comes within the given range of the desired (constant setpoint) vessel speed. Once the measured vessel speed as read by the GPS device 52 comes within the given range of the desired vessel speed, the control module 46 determines that the mode has switched from launch to cruise control. (The control module 46 may also require that a delay time has passed since the measured vessel speed came within the given range of the desired vessel speed before switching to the cruise control mode, which allows the values of the initial conditions to change before the PID resets due to the state change.) Referring back to FIG. 2, once the measured vessel speed comes within the given range of the desired vessel speed and, if required, the delay time has passed, the control module 46 thereafter switches to providing output from the summer 62 to the cruise control PID controller (second feedback controller 56). The error from summer 62 is provided to box 66, where it is multiplied by a proportional gain to determine the P-term 804, which is a decreasing negative number in order to accelerate the vessel 38 according to the prescribed overshoot parameters. The accumulated error is provided to box 68, where it is multiplied by the integral gain to determine the I-term, which has been reset to the engine speed (plus an optional offset) in response to the mode change from launch to cruise control.

In order to phase in the D-term, the second feedback controller 56 first calculates the allowable derivative gain, as shown at box 70, before calculating the D-term. The allowable derivative gain may be zero, or it may be the lesser of the full derivative gain or the previous derivative gain from the previous control iteration plus an allowable step. The allowable derivative gain will be zero if the two conditions for phasing in the D-term have not yet been met. For example, the D-term remains at zero until both (a) the actual vessel speed is within the given range of the desired vessel speed, and (b) the acceleration rate is less than a given value. After the two conditions for phasing in the D-term have been met, the allowable derivative gain will then be the lesser of the full derivative gain or the previous derivative gain plus an allowable step. The derivative gain will be ramped in from a starting value of zero to the full derivative gain, such as described hereinabove.

After the allowable derivative gain is calculated at box 70, it can be multiplied by the rate of change of the vessel speed error in order to determine the D-term. In cruise control mode, the desired vessel speed is constant. Recalling that the derivative of a constant is zero, the rate of change of the vessel speed error can be simplified as follows:

$$\frac{de(t)}{dt} = \frac{d(DS - AS)}{dt} = -\frac{dAS}{dt}$$

where DS is the desired vessel speed (a constant) and AS is the actual vessel speed. Because the derivative of the vessel speed is by definition acceleration, the D-term can therefore be determined by multiplying the derivative gain from box 70 by the opposite of the acceleration rate of the vessel, as shown at box 72.

Each of the outputs from boxes 66, 68, and 72 are then added at summer 74. The output of summer 74 is then sent to the engine 42 to adjust throttle position and/or pulse width, as shown at box 64. After the engine's operating conditions have been adjusted, the vessel speed is again read at box 58, and provided to summer 62 to determine the difference from the setpoint vessel speed, which setpoint is constant so long as the system 39 remains in cruise control mode. The P and I calculations are then performed as before. The derivative gain will change according to the ramp rate and the value of the full derivative gain. The newly calculated derivative gain will again be multiplied by the opposite of the vessel acceleration rate to determine the D-term, which is then sent to summer 74. This process continues until the derivative gain is ramped up to the full derivative gain, which can thereafter be used while the system 39 remains in the cruise control mode. Note that phasing or ramping in of the D-term prevents undershoot of the desired vessel speed.

If the desired vessel speed changes at any point in response to movement of the throttle handle 48, a new setpoint value is determined at box 60, and either the full or limited derivative gain will be used as determined at box 70, as appropriate, depending on whether the derivative gain had been fully ramped in before the desired vessel speed changed. If the measured vessel speed is outside of a predetermined deadband around the desired vessel speed for greater than a predetermined period of time, but the desired vessel speed has not changed, the control module 46 will transition the system 39 out of the cruise control mode. In this instance, the vessel 38 may not be able to maintain the desired vessel speed due to load, external conditions, or any other number of factors, and controlling for the desired vessel speed is therefore no longer appropriate. Further details of the deadband will be described herein below.

During research and development, the present inventors noted that using the reading of SOG from the GPS device 52 required filtering to optimize operation of the marine vessel 38 in the cruise control mode. For example, FIG. 2 shows how the measured vessel speed read at box 58 is filtered in box 76 before being provided to the first feedback controller 54 or the second feedback controller 56. During the launch mode, the first feedback controller 54 requires a basically unfiltered SOG signal to give the control module 46 and associated propulsion system 39 the best time to react to the vessel's dynamics. In contrast, while in cruise control mode, the propulsion system 39 could not smoothly handle discrete steps in the SOG reading, and this signal therefore needed to be filtered. For example, when the SOG reading was not filtered during the cruise control mode, the operator would experience, for example, a change in engine speed of 50-150 RPM almost instantly, which caused discomfort to passengers and pulled on a tow rope attached to the boat for use by water skiers or wakeboarders. The present inventors therefore developed an algorithm that causes the control module 46 to filter the measured vessel speed (for example, SOG) differently while the propulsion system 39 is in the launch mode than while the propulsion system 39 is in the cruise control mode. In one example, the control module 46 continually filters the SOG reading according to two different filters and switches from using one filter to using the other when the system 39 transitions from launch to cruise control. In another example, the control module 46 can use one filter while the system 39 is in the launch mode and can phase in another filter once the system 39 transitions to the cruise control mode. These and other examples will be described herein below.

Figure 5:
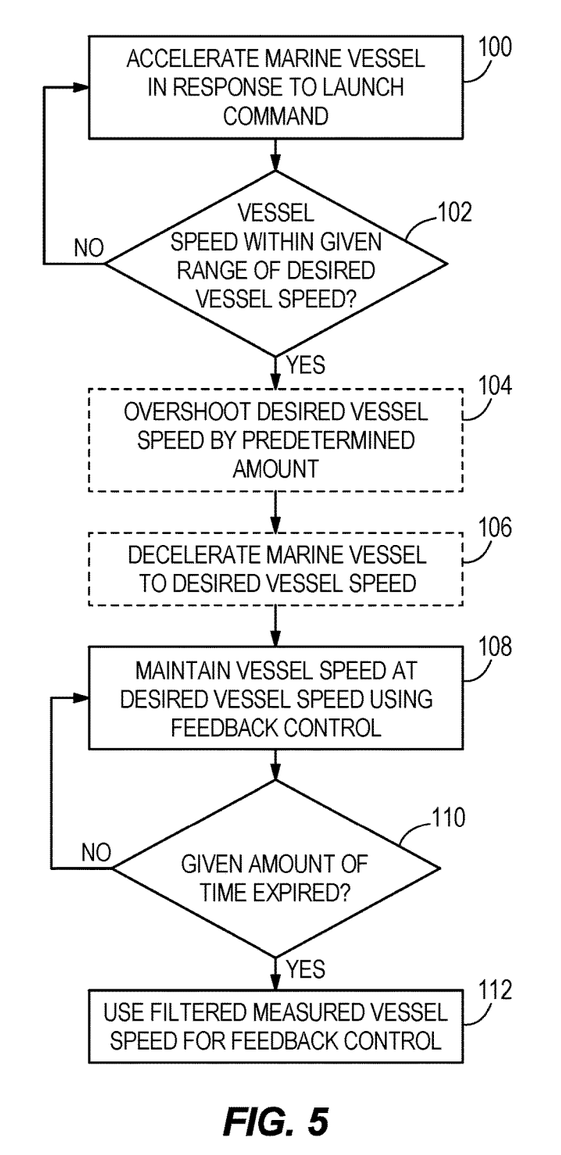
FIG. 5 shows one example of a method for accelerating a marine vessel according to the present disclosure.

Referring to FIG. 5, a method for controlling a speed of a marine vessel 38 includes, as shown at 100, accelerating the marine vessel 38 in response to a launch command. The launch command can be generated as described above, such as when an operator moves the throttle handle 48 forward suddenly, and may require that a given acceleration profile is selected beforehand via the control panel 50. Next, as shown at box 102, the method includes determining if the vessel speed is within a given range of a desired vessel speed, which can be a constant setpoint vessel speed. The vessel speed value compared to the desired vessel speed can be either the raw, unfiltered reading of SOG from the GPS device 52 or the filtered measured vessel speed. If NO at box 102, the method returns to box 100, because the vessel speed must increase more before it comes within the given range of the desired vessel speed. If YES at box 102, the method optionally includes overshooting the desired vessel speed by a predetermined amount, as shown at 104. As shown at box 106, the method then optionally includes decelerating the marine vessel to the desired vessel speed. Steps 104 and 106 are accomplished as described herein above with respect to FIGS. 1, 3, and 4. Note that if an overshoot condition is not provided, the vessel speed is instead accelerated directly to the desired vessel speed. The system 39 transitions from the launch mode to the cruise control mode in response to the control module 46 determining that the measured vessel speed is within the given range of the desired vessel speed. Thereafter, the method includes maintaining the vessel speed at the desired vessel speed using feedback control, as shown at box 108. Referring briefly to FIG. 2, the system 39 is now in the cruise control mode, in which the control module 46 uses a difference between a measured vessel speed (see box 58) and the constant setpoint vessel speed (see box 60) to calculate control parameters used by the second feedback controller 56.

Returning to FIG. 5, the system transitions from the launch mode to the cruise control mode in response to the control module 46 determining that the measured vessel speed has been within the given range of the desired vessel speed for at least a given amount of time, as shown at 110. If YES, the control module 46 performs the feedback control using a filtered measured vessel speed, as shown at 112. More specifically, the second feedback controller 56 minimizes a difference between the filtered measured vessel speed and the desired vessel speed in response to the control module 46 determining that the system 39 has transitioned from the launch mode to the cruise control mode. Additionally, the control module 46 may again check that the measured vessel speed is within the given range of the desired vessel speed after the timer has expired, before using the filtered measured vessel speed in the vessel speed feedback control. If the determination at 110 is NO, the method may return to box 108 and iterate until the timer expires.

Regarding the condition at box 102, in one example, the given range (within which the measured or filtered measured vessel speed must be of the desired vessel speed) varies proportionately with a magnitude of the desired vessel speed. For example, the given range may be anywhere from 0 KPH to 10 KPH. By way of illustration, a vessel operating at a level 1 acceleration profile might be required to reach the desired vessel speed (i.e., be within a given range of 0 KPH from the desired vessel speed) before the cruise control mode is entered. On the other hand, because vessel speed lags farther behind engine speed for higher desired speed setpoints, a level 5 acceleration profile might require that vessel speed is only within 10 KPH of the desired vessel speed before the cruise control mode is entered, in order to prevent massive overshoot. Levels 2-4 would be associated with given ranges between, in this example, 0 KPH and 10 KPH. The given range may also be determined based on the acceleration rate of the vessel 38, as will be discussed herein below.

Figure 6:
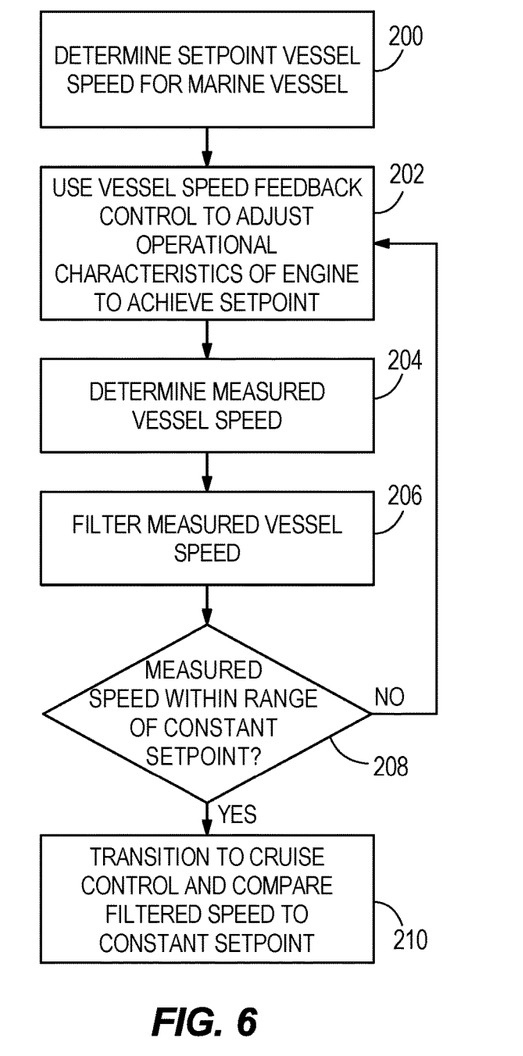
FIG. 6 shows another example of a method for accelerating a marine vessel according to the present disclosure.

FIG. 6 illustrates another method for controlling a speed of a marine vessel 38 powered by a marine propulsion system 39 including an engine 42 is disclosed. The method is carried out by a control module 46 and includes determining a setpoint vessel speed for the marine vessel 38, as shown at 200. According to the present disclosure, the setpoint vessel speed is constant while the system 39 is operating in a cruise control mode. The system 39 may also be operated in a launch mode in response to a launch command, wherein in the launch mode, the setpoint vessel speed is instantaneous and increases according to a predetermined acceleration profile toward the constant setpoint vessel speed. As shown at 202, the method includes using vessel speed feedback control to adjust operational characteristics of the engine 42 so as to achieve the setpoint vessel speed, whether it be the constant setpoint vessel speed or the instantaneous setpoint vessel speed. As shown at box 204, the method also includes determining a measured vessel speed. This may include reading SOG from the GPS device 52 aboard the vessel 38.

The method also includes filtering the measured vessel speed, as shown at box 206. In one example, the method includes filtering the measured vessel speed using a non-linear filter, which can be digital or analog. For example, the non-linear filter can be a median filter, which takes N numbers of samples (a "window") of consecutively measured vessel speeds, orders the samples from low to high, and outputs the middle (median) number as the filtered vessel speed. Such a filter will have an inherent lag that increases as N increases, as SOG readings included in the sampling window are necessarily values that were read in the past. However, such a filter is able to remove noise from the GPS signal, such as an outlying high or low SOG reading that might otherwise result in a noticeable change in engine speed as the second feedback controller 56 attempts to nullify the error between the raw SOG reading and the constant setpoint vessel speed. In other examples, the filter can be a mode filter, a mean filter, or a Hampel filter, which replaces outlier values that are equivalent to a few standard deviations away from the local median value. The samples of SOG can be equally weighted or weighted differently, such that more recent SOG values (likely read when the marine vessel 38 is fully on-plane and cruising at steady state) are weighted more heavily.

In response to determining that the measured vessel speed is within a given range of the constant setpoint vessel speed (YES at box 208), the method includes transitioning to the cruise control mode and comparing the filtered measured vessel speed to the constant setpoint vessel speed for purposes of the feedback control, as shown at box 210. An additional condition may be provided between boxes 208 and 210, and the method may further include transitioning from the launch mode to the cruise control mode and comparing the filtered measured vessel speed to the constant setpoint vessel speed for purposes of the feedback control in response to determining that the measured vessel speed has been within the given range of the constant setpoint vessel speed for at least a given amount of time. Essentially, this ensures that the vessel 38 has been cruising at or near the constant setpoint vessel speed for a certain amount of time, and therefore likely will continue to cruise at or near that speed, before the algorithm will continue. Note that two timers may be employed before the filtered measured vessel speed will be used for purposes of comparison to the desired vessel speed during feedback control: the above-mentioned delay timer used when determining if the system 39 should switch from launch mode to cruise control mode, and another timer once the system 39 is in cruise control mode, to determine if cruise control mode has been active long enough to begin using the filter. The two timers may require that the same amount of time expires, or that different amounts to time expire, before the algorithm will continue. Alternatively, only one of the above-described timers may be used.

If the answer at 208 is NO, the method returns to box 202 and the operational characteristics of the engine 42 are further adjusted to obtain the setpoint vessel speed. During this time, the system 39 may still be in the launch mode, during which the method includes comparing the measured vessel speed to the instantaneous setpoint vessel speed for purposes of the feedback control performed by the first feedback controller 54. As noted herein above, it is not necessary to filter the measured vessel speed for purposes of feedback control while in the launch mode, although light filtering could be applied as described herein below.

Once the system 39 has transitioned into the cruise control mode at 210, the method may further include transitioning out of the cruise control mode in response to determining that the measured vessel speed has been outside of a deadband around the constant setpoint speed for at least a given amount of time. The deadband may encompass vessel speeds both above and below the constant setpoint vessel speed, and can be the same as or different from the given range used to determine if the system 39 entered the cruise control mode in the first place (see box 208). In one example, the deadband is determined from an input-output map given the value of the constant setpoint vessel speed. The given amount of time can be the same as or different from the given amount of time used to determine if the system 39 entered the cruise control mode in the first place. In one example, the given amount of time for which the measured vessel speed has been outside the deadband is a calibrated, predetermined value.

Figure 7:
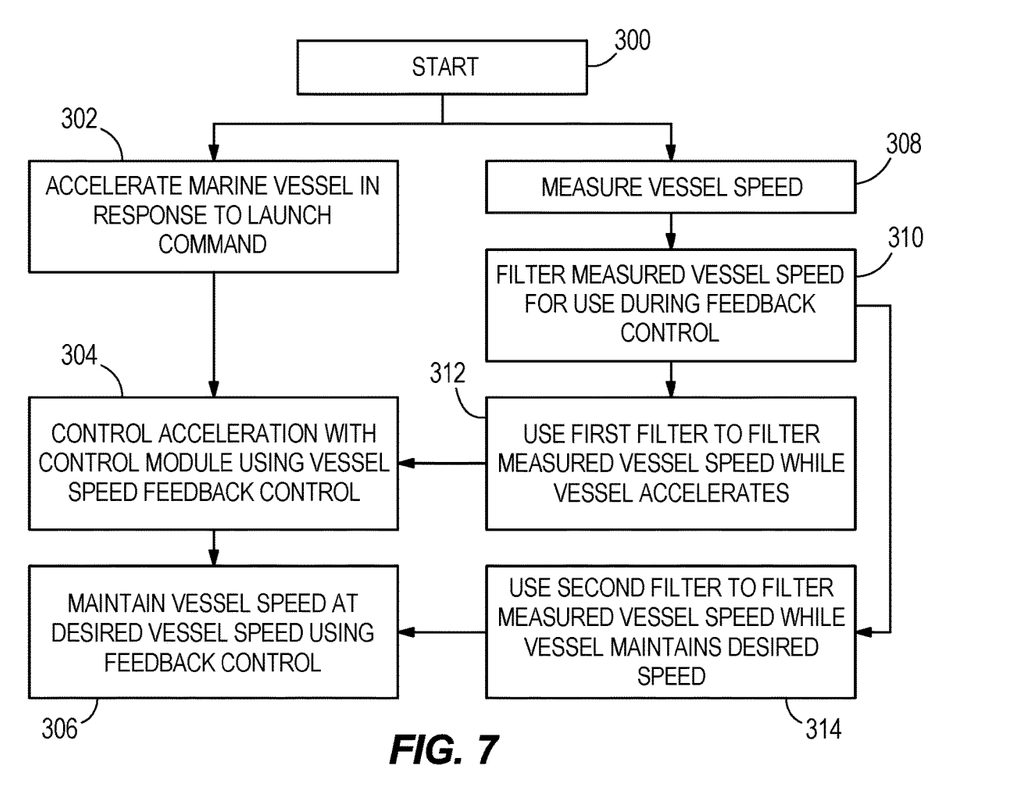
FIG. 7 shows another example of a method for accelerating a marine vessel according to the present disclosure.

FIG. 7 illustrates another method for controlling the speed of the marine vessel 38. The method begins at 300. At box 302, the marine vessel 38 accelerates in response to a launch command. As shown at box 304, the method includes controlling acceleration of the marine vessel 38 with a control module 46 using vessel speed feedback control. As shown at box 306, the method also includes maintaining the vessel speed at a desired vessel speed using the feedback control. As described herein above, the method may also include controlling acceleration of the marine vessel with the control module 46 using a first feedback control algorithm (such as by using the first feedback controller 54 as described herein above) and maintaining the vessel speed at the desired vessel speed with the control module 46 using a second, different feedback control algorithm (such as by using the second feedback controller 56 as described herein above). Simultaneously, the method includes measuring the vessel speed, as shown at box 308, and filtering the measured vessel speed for use during the feedback control, as shown at box 310. The control module 46 uses a first filter to filter the measured vessel speed while the marine vessel 38 accelerates, as shown at box 312. The values output from the first filter are used by the first feedback controller 54 during launch. The control module 46 uses a second filter to filter the measured vessel speed while the marine vessel 38 maintains the desired vessel speed, at shown at box 314. The values output from the second filter are used by the second feedback controller 56 during cruise control.

According to the present disclosure, the control module 46 switches from using an output of the first filter to using an output of the second filter in response to determining that the measured vessel speed is within a given range of the desired vessel speed. In one example, the control module 46 filters the measured vessel speed with the first filter while simultaneously filtering the measured vessel speed with the second filter, and switches from using the output of the first filter to using the output of the second filter immediately in response to determining that the measured vessel speed is within the given range of the desired vessel speed. In another example, the control module 46 filters the measured vessel speed using the first filter while the marine vessel accelerates; filters the measured vessel speed using a transitional filter in response to determining that the measured vessel speed is within the given range of the desired vessel speed; and filters the measured vessel speed using the second filter while the marine vessel maintains the desired vessel speed. For example, if the filters are median filters, and the first filter has a sample size of N=1, while the second filter has a sample size of N=5, the transitional filter may have a sample size of N=3. Alternatively, during successive iterations of control, the transitional filter may have sample sizes of N=2, then N=3, then N=4, so as to allow the sample sizes to gradually build up from the lesser number used by the first filter to the greater number used by the second filter.

The first and second filters may both be non-linear filters of the types mentioned herein above. For example, the first and second filters can be median filters that process first and second different numbers of samples of measured vessel speeds per iteration. Because the measured vessel speed does not require much filtering during the launch mode, the first filter may process one sample of measured vessel speed per iteration, i.e., N=1 as in the example provided above. If the first filter processes more than one sample per iteration, the number of samples the first filter processes is in any case less than the number of samples the second filter processes. If the SOG signal is filtered too heavily during launch, the vessel 38 will have less time to react to dynamic conditions due to the inherent lag of the filter, which would affect launch control. On the other hand, if the SOG signal was unfiltered or not filtered enough during cruise control, the vessel 38 would experience jerky step changes, as the engine speed adjusted to correct for error due to noise from the GPS device 52. Therefore, using two different filters, and perhaps not technically filtering the SOG signal during launch at all (i.e., N=1), can provide the needed amount of filtering during each mode. This way, while almost real-time reaction to a change in SOG is provided during launch, noise can be removed from the SOG signal during cruise control.

Figure 8:
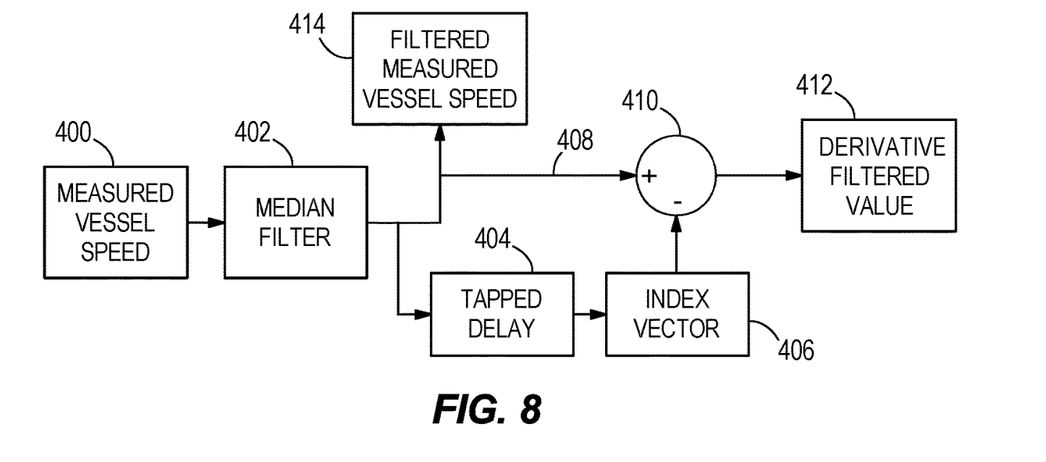
FIG. 8 shows a subroutine that can be used in the methods described herein.

FIG. 8 shows a subroutine that may be used in any of the methods described herein above. After the measured vessel speed (box 400) is filtered, for example using a median filter as shown at box 402, the control module 46 may implement a tapped delay 404, which delays its input by a calibrated number of sample periods and outputs all the delayed versions in a vector. An index vector block 406 can be used to output an element of the vector from the tapped delay 404 whose index matches the control input, which control input may be predetermined. The control module 46 can compare the filtered measured vessel speed (input along line 408) to the output of the index vector 406 at summer 410 and output a derivative filtered value 412 based on this comparison. While in the cruise control mode, the derivative filtered value 412 is used to determine the D-term in the PID control. For example, referring back to FIG. 2, the derivative filtered value 412 is the "acceleration" value that is multiplied by −1 and the derivative gain in box 72 of the second feedback controller 56. While in the cruise control mode, the filtered measured vessel speed 414 can also be used by the summer 62 to determine the error between the "actual" and setpoint vessel speeds for purposes of determining the P-term and the I-term. The derivative filtered value 412 (i.e., the acceleration rate) and the constant setpoint vessel speed can also be used to find the given range used to determine if the propulsion system 39 should transition to the cruise control mode.

As mentioned herein above, while in the launch mode, the SOG does not necessarily need to be filtered. In the event that a filtered value of the measured vessel speed is used for PID control while in the launch mode, note that both the first and second filters described with respect to FIG. 7 can be implemented with a tapped delay 404 and index vector 406 in order to determine a filtered measured vessel speed 414 and a derivative filtered value 412 of measured vessel speed, as described with respect to FIG. 8. However, while in the launch mode, the setpoint vessel speed is not constant, and the filtered measured vessel speed 414 is therefore compared to the instantaneous setpoint vessel speed for purposes of calculating each of the P, I, and D terms with the first feedback controller 54.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A method for controlling a speed of a marine vessel, the method comprising:
   accelerating the marine vessel in response to a launch command;
   controlling acceleration of the marine vessel with a control module using vessel speed feedback control;

maintaining the vessel speed at a desired vessel speed using the feedback control;
measuring the vessel speed; and
filtering the measured vessel speed for use during the feedback control;
wherein the control module uses a first filter to filter the measured vessel speed while the marine vessel accelerates and uses a second filter to filter the measured vessel speed while the marine vessel maintains the desired vessel speed;
wherein the control module switches from using an output of the first filter to using an output of the second filter in response to determining that the measured vessel speed is within a given range of the desired vessel speed; and
wherein the control module filters the measured vessel speed with the first filter while simultaneously filtering the measured vessel speed with the second filter, and switches from using the output of the first filter to using the output of the second filter immediately in response to determining that the measured vessel speed is within the given range of the desired vessel speed.

2. The method of claim 1, wherein the first and second filters are non-linear filters.

3. The method of claim 2, wherein the first and second filters are median filters that process first and second different numbers of samples of measured vessel speeds per iteration.

4. The method of claim 3, wherein the first filter processes one sample of measured vessel speed per iteration.

5. The method of claim 1, further comprising:
controlling acceleration of the marine vessel with the control module using a first feedback control algorithm; and
maintaining the vessel speed at the desired vessel speed with the control module using a second, different feedback control algorithm.

6. The method of claim 1, wherein measuring the vessel speed comprises reading speed over ground from a global positioning system device aboard the marine vessel.

7. A method for controlling a speed of a marine vessel, the method comprising:
accelerating the marine vessel in response to a launch command;
controlling acceleration of the marine vessel with a control module using vessel speed feedback control;
maintaining the vessel speed at a desired vessel speed using the feedback control;
measuring the vessel speed; and
filtering the measured vessel speed for use during the feedback control;
wherein the control module uses a first filter to filter the measured vessel speed while the marine vessel accelerates and uses a second filter to filter the measured vessel speed while the marine vessel maintains the desired vessel speed;
wherein the first and second filters are non-linear filters;
wherein the first and second filters are median filters that process first and second different numbers of samples of measured vessel speeds per iteration; and
wherein the second filter processes a greater number of samples of measured vessel speeds per iteration than does the first filter.

8. The method of claim 7, wherein the control module further:
filters the measured vessel speed using the first filter while the marine vessel accelerates;
filters the measured vessel speed using a transitional filter in response to determining that the measured vessel speed is within a given range of the desired vessel speed; and
filters the measured vessel speed using the second filter while the marine vessel maintains the desired vessel speed.

9. A system for controlling a speed of a marine vessel, the system comprising:
a propulsion device that accelerates the marine vessel in response to a launch command;
a control module that controls acceleration of the marine vessel using vessel speed feedback control; and
a global positioning system device that measures the vessel speed;
wherein the control module maintains the vessel speed at a desired vessel speed using the feedback control;
wherein the control module filters the measured vessel speed for use during the feedback control;
wherein the control module uses a first filter to filter the measured vessel speed while the marine vessel accelerates and uses a second filter to filter the measured vessel speed while the marine vessel maintains the desired vessel speed;
wherein the first and second filters are non-linear filters;
wherein the first and second filters are median filters that process first and second different numbers of samples of measured vessel speeds per iteration; and
wherein the second filter processes a greater number of samples of measured vessel speeds per iteration than does the first filter.

10. The system of claim 9, wherein the control module switches from using an output of the first filter to using an output of the second filter in response to determining that the measured vessel speed is within a given range of the desired vessel speed.

11. The system of claim 10, wherein the control module filters the measured vessel speed with the first filter while simultaneously filtering the measured vessel speed with the second filter, and switches from using the output of the first filter to using the output of the second filter immediately in response to determining that the measured vessel speed is within the given range of the desired vessel speed.

12. The system of claim 10, wherein the control module further:
filters the measured vessel speed using the first filter while the marine vessel accelerates;
filters the measured vessel speed using a transitional filter in response to determining that the measured vessel speed is within the given range of the desired vessel speed; and
filters the measured vessel speed using the second filter while the marine vessel maintains the desired vessel speed.

13. The system of claim 9, wherein the first filter processes one sample of measured vessel speed per iteration.

14. The system of claim 9, wherein the control module:
controls acceleration of the marine vessel using a first feedback control algorithm; and
maintains the vessel speed at the desired vessel speed using a second, different feedback control algorithm.

* * * * *